US008696904B2

(12) United States Patent
Thiyagarajan et al.

(10) Patent No.: US 8,696,904 B2
(45) Date of Patent: Apr. 15, 2014

(54) MULTI-LEAF REVERSE OSMOSIS ELEMENT

(75) Inventors: Ramasamy Thiyagarajan, Louisville, KY (US); Todd Alan Anderson, Niskayuna, NY (US); Anubhav Kumar, Bangalore (IN); Philip Paul Beauchamp, Rexford, NY (US); Gurumkonda Srinivasa Rao Hanumanth, Bangalore (IN)

(73) Assignee: General Electric Company, Niskayuna, NY (US)

( * ) Notice: Subject to any disclaimer, the term of this patent is extended or adjusted under 35 U.S.C. 154(b) by 276 days.

(21) Appl. No.: 12/913,840

(22) Filed: Oct. 28, 2010

(65) Prior Publication Data
US 2012/0103891 A1    May 3, 2012

(51) Int. Cl.
*B01D 63/12* (2006.01)
*B01D 61/08* (2006.01)
*B01D 61/02* (2006.01)

(52) U.S. Cl.
CPC ............. *B01D 63/12* (2013.01); *B01D 61/08* (2013.01); *B01D 61/025* (2013.01); *B01D 2319/04* (2013.01); *B01D 2313/21* (2013.01)
USPC ............. 210/321.76; 210/321.85; 210/323.1; 210/323.2; 210/458; 210/486; 210/650; 210/652

(58) Field of Classification Search
CPC ........ B01D 63/12; B01D 63/10; B01D 61/02; B01D 61/022; B01D 61/025; B01D 61/08; B01D 61/18; B01D 61/14
USPC ............. 210/321.73, 321.74, 321.76, 321.83, 210/321.85, 323.1, 323.2, 338, 331, 458, 210/486, 650, 652

See application file for complete search history.

(56) References Cited

U.S. PATENT DOCUMENTS

| 3,397,790 | A | * | 8/1968 | Newby et al. ............ 210/321.83 |
| 4,083,780 | A | * | 4/1978 | Call ........................... 210/652 |
| 5,951,863 | A | | 9/1999 | Kruger et al. |
| 7,513,996 | B2 | | 4/2009 | Kloos et al. |

FOREIGN PATENT DOCUMENTS

| EP | 819466 B1 | 11/2004 |
| WO | 9310889 A1 | 6/2003 |

* cited by examiner

*Primary Examiner* — Lore Jarrett
*Assistant Examiner* — Benjamin J Behrendt
(74) *Attorney, Agent, or Firm* — Mary Louise Stanford

(57) ABSTRACT

A reverse osmosis element is provided. The reverse osmosis element includes a plurality of permeate tubes arranged to form a core frame. The reverse osmosis element further includes a plurality of leaves wound over the core frame. Each leaf of the plurality of leaves is coupled to one permeate tube of the plurality of permeate tubes. A retentate channel is defined by the plurality of permeate tubes of the core frame, and sealed by the plurality of leaves wound over the core frame. The reverse osmosis element includes first and a second end caps coupled to the plurality of permeate tubes. At least one of the first and the second end caps includes a retentate discharge port, and at least one of the first and second end caps includes one or more permeate discharge ports.

12 Claims, 8 Drawing Sheets

MULTI-LEAF REVERSE OSMOSIS ELEMENT

BACKGROUND

Embodiments presented herein relate to reverse osmosis elements and more particularly to spiral feed flow reverse osmosis elements.

Reverse osmosis is widely used for purifying fluids such as water. In reverse osmosis, a feed solution such as, brackish or impure water, sea water, and so forth, is passed through a semi-permeable membrane at a pressure higher than the osmotic pressure of the feed water. A permeate, for example, purified water is obtained on the other side of the semi-permeable membrane.

Current reverse osmosis systems typically include cross flow type elements, with feed that flows axially through the element and permeate that flows spirally into the core. Although less common, spiral feed flow elements also exist. Both cross flow elements and spiral feed flow elements include a leaf wound around a core. The leaf may include a layer of permeate carrier sandwiched between two layers of membrane element and a layer of feed spacer, disposed adjacent to one or both membrane element layers. In cross flow elements, the feed solution is fed into the cross flow element axially at high pressure. The feed solution flows through the membrane element, and the permeate flows spirally through the permeate carrier, and into the core. In spiral feed flow elements, the feed solution flows spirally through the element. The permeate is collected in a permeate channel within the core of the spiral feed flow element and discharged at one or both ends of the spiral feed flow element while the retentate is collected in a separate retentate channel within the core, and flows out one or both ends of the spiral feed flow element. The core in a spiral feed flow element includes separate channels for permeate flow and retentate flow.

Usually a number of cross flow elements may be connected in series to achieve high permeate recovery. As permeate is recovered through the cross flow element, the feed velocity decreases in the feed channel. Such a reduction in feed flow velocities may contribute to fouling of the RO membrane surface. One technique for overcoming the reduction in feed flow velocities includes arranging the cross flow elements in a tapered arrangement. The tapered arrangement includes multiple stages plumbed in series. Each stage includes multiple cross flow elements plumbed in parallel. Each successive stage includes fewer cross flow elements in parallel than the preceding stage. For instance, a three stage tapered arrangement may include four cross flow elements in parallel in the first stage, feeding two cross flow elements in parallel in the second stage, which in turn feed a single cross flow element in the third stage. Each stage feeds the retentate to the next stage. However, the tapered arrangements may increase the cost and the complexity of the RO system.

Further, the feed solution pressure may cause the cross flow element to expand and open up the feed channel flow path. Such expansion also decreases the feed velocity. To ensure that the cross flow element does not expand under feed pressure, cross flow elements are typically enclosed in a casing. Also, cross flow elements may undergo telescoping due to the axial load of the feed solution pressure. One solution to prevent telescoping is the use of anti-telescoping devices disposed at the ends of the cross flow elements. However, anti-telescoping devices reduce the active area of the cross flow element, add cost and increase complexity of the RO system.

Spiral feed flow elements have feed channels and permeate channels of approximately equal spiral length. To reduce permeate backpressure to a minimum and achieve high efficiency, a leaf with a short spiral length is required. However, a leaf with a short spiral length results in spiral feed flow elements that have a small exterior diameter, or spiral feed flow elements having a complicated core design to accept multiple short leaves.

Therefore there is a need for a reverse osmosis element that overcomes these and other shortcomings.

BRIEF DESCRIPTION

A reverse osmosis element is provided. The reverse osmosis element includes a plurality of permeate tubes arranged to form a core frame. The reverse osmosis element further includes a plurality of leaves which are coupled to the permeate tubes. At least one of the core frame and the plurality of leaves wound over the core frame form a retentate channel. The reverse osmosis element includes first and second end caps coupled to the plurality of permeate tubes. At least one of the first and second end caps includes a retentate discharge port, and at least one of the first and second end caps includes one or more permeate discharge ports.

A nested reverse osmosis element is provided. The nested reverse osmosis element includes a plurality of permeate tubes arranged to form an outer core frame, and an inner core frame disposed in an interior of the outer core frame. The nested reverse osmosis element further includes a plurality of leaves coupled to the permeate tubes. An intermediate channel is formed between the outer core frame and the inner core frame. The intermediate channel is formed by at least one of the outer core frame, first ones of the plurality of leaves wound over the outer core frame, the inner core frame, and second ones of the plurality of leaves wound over the inner core frame. At least one of the inner core frame and the second ones of the plurality of leaves wound over the inner core frame form a retentate channel. The nested reverse osmosis element also includes first and second end caps coupled to the plurality of permeate tubes. At least one of the first and second end caps includes a retentate discharge ports, and at least one of the first and second end caps includes one or more permeate discharge ports.

DETAILED DESCRIPTION

Various embodiments presented herein will be described in detail below with reference to the accompanying drawings. It will be apparent, however, that these embodiments may be practiced with all or some of these specific details. In other instances, well known process steps or elements have not been described in detail in order not to unnecessarily obscure the description of the embodiments. The following example embodiments and their aspects are described and illustrated in conjunction with apparatuses, methods, and systems which are meant to be illustrative examples, not limiting in scope.

Embodiments presented herein describe multi-leaf spiral feed flow reverse osmosis (RO) elements. The spiral feed flow RO element may be used, for instance, in desalination systems for desalinating brackish or seawater. Feed water is pumped under high pressure into one or more inlets disposed on the circumference of the spiral feed flow RO element. The feed water follows a spiral path through a wound membrane stack separating into purified water (permeate) and impurities (retentate).

Figure 1:
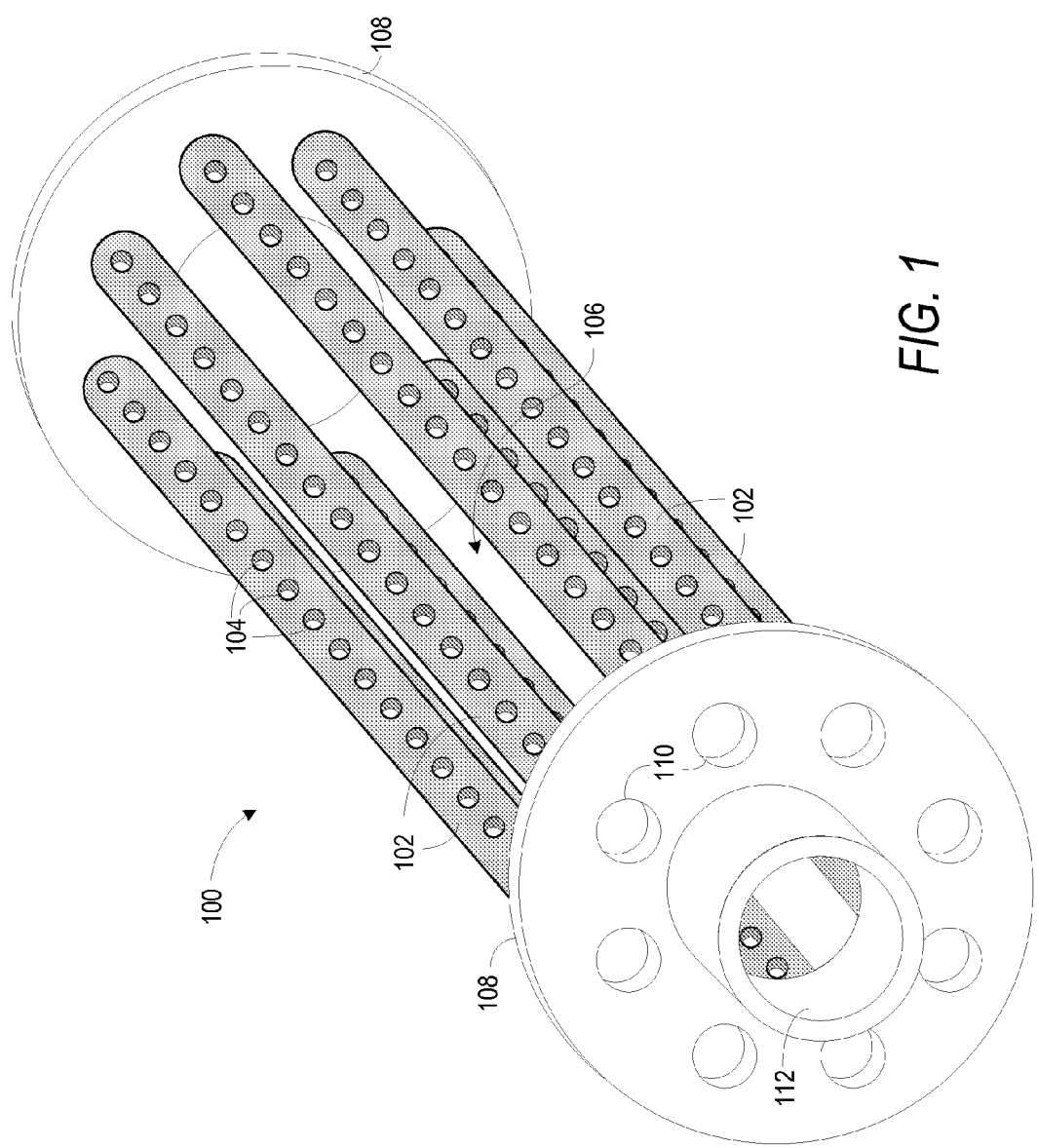
FIG. 1 illustrates an exemplary reverse osmosis element core, according to one embodiment.

FIG. 1 illustrates an exemplary RO element core 100, according to one embodiment. The element core 100 includes a plurality of permeate tubes 102 arranged to the form a core frame. The permeate tube 102 may be manufactured using materials such as, but not limited to, polymers, metals, composites, alloys and the like. The permeate tube 102 may have a circular cross section as shown in FIG. 1. Alternatively, the permeate tube 102 may have a tear drop shaped cross section, an airfoil shaped cross section, a triangular cross section, and so forth. Permeate tubes 102 having a tear drop, airfoil or triangular shaped cross section may enable better coupling with a leaf.

The permeate tube 102 includes a plurality of perforations 104. The plurality of perforations 104 may include circular holes, longitudinal slits, transverse slits and the like. The perforations 104 may be formed by gang drilling the permeate tubes 102. More complex shapes of perforations such as, slits, and polygonal perforations, may be formed using punches. The perforations 104 facilitate the flow of the permeate into the permeate tube 102 from the leaf (not shown in FIG. 1).

A retentate channel 106 is formed by the permeate tubes 102 of the core frame. Each permeate tube 102 is coupled to a leaf. The leaves are wound over the core frame to form the spiral feed flow RO element. The winding of the leaves over the core frame seals the retentate channel 106. In other words, the retentate channel 106 is an open channel, defined by the inner extent of the permeate tubes 102 of the core frame, and further defined by winding the leaves over the core frame.

The plurality of permeate tubes 102 are coupled to end caps 108. The end caps 108 may include one or more permeate discharge ports 110 for facilitating the discharge of the permeate from the permeate tubes 102. The end caps 108 may also include at least one retentate discharge port 112 for discharging the retentate from the retentate channel 106. FIG. 1 illustrates both the end caps 108 including a plurality of permeate discharge ports 110, and one retentate discharge port 112. Various other configurations of discharge ports on the end caps 108 are possible. For instance, one of the two end caps 108 may include the permeate discharge ports 110, while the other end cap 108 may include the retentate discharge port 112. Such a configuration allows the discharge of the retentate and the permeate from opposite ends of the RO element. Alternatively, one end cap 108 may include the permeate discharge ports 110, and a retentate discharge port 112, while the other end cap 108 may include no discharge ports. Such a configuration allows the discharge of the permeate and the retentate from the same end of the RO element. The end caps 108 are further described in conjunction with FIG. 5A and FIG. 5B.

Figure 2:
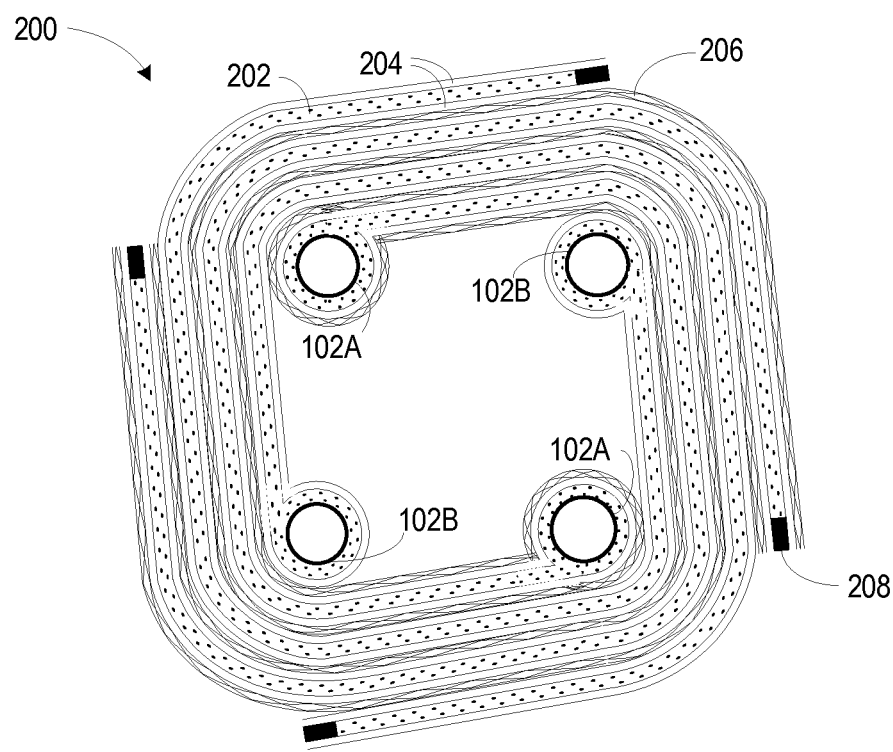
FIG. 2 illustrates a cross section view of an exemplary reverse osmosis element core, according to one embodiment.

FIG. 2 illustrates a cross section view of an exemplary reverse osmosis element 200, according to an embodiment. RO element 200 includes a plurality of permeate tubes 102a, and 102b. For simplicity, the perforations 104 are not illustrated in FIG. 2. The permeate tubes 102 are each coupled to a leaf element. The leaf elements may include at least one of a permeate carrier 202, a semi-permeable membrane 204, and a feed spacer 206. FIG. 2 illustrates one implementation of arrangement of the leaf elements. The leaf elements coupled to the permeate tubes 102a include the permeate carrier 202, the semi-permeable membrane 204, and the feed spacer 206. The leaf elements coupled to the permeate tubes 102b include the permeate carrier 202, and the semi-permeable membrane 204, but do not include the feed spacer 206. Such an arrangement may help reduce extra feed spacer elements. Such an arrangement may also reduce the overall diameter of the RO element. Alternatively, such an arrangement may accommodate more leaves within the same diameter. However, it will be appreciated, that all leaf elements may include all three elements.

Figure 3:
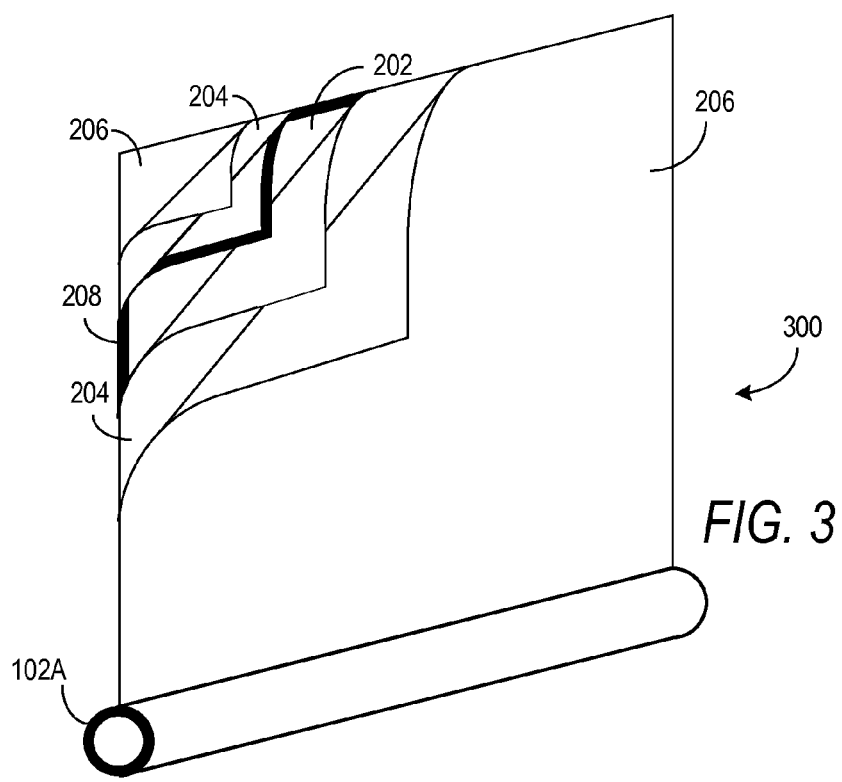
FIG. 3 illustrates an exemplary leaf structure coupled to a permeate tube, according to one embodiment.
Figure 4:
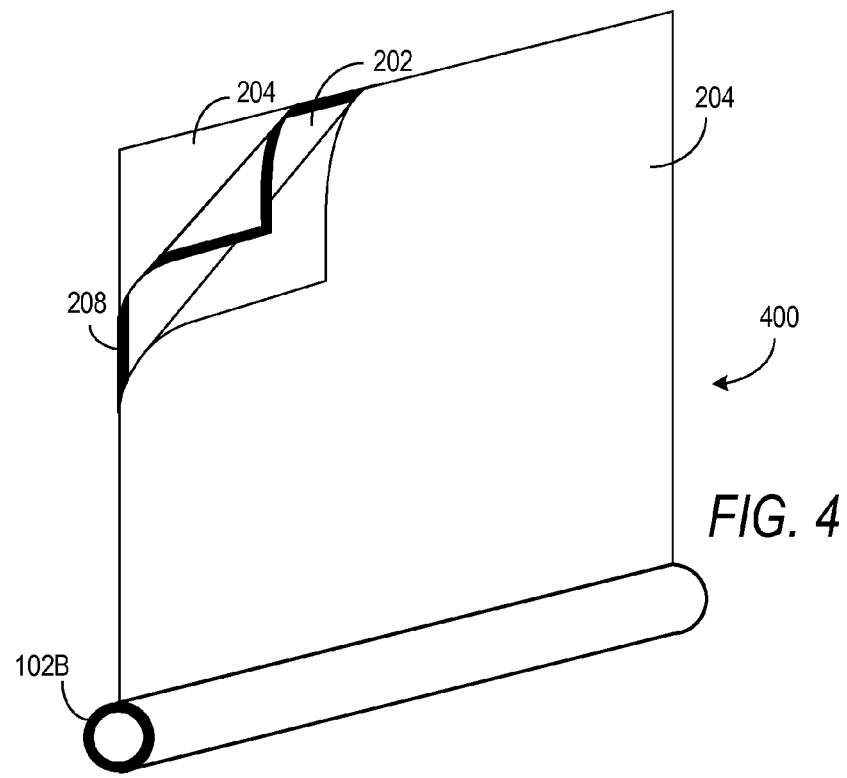
FIG. 4 illustrates an exemplary leaf structure coupled to a permeate tube, according to another embodiment.

The leaves may be coupled to the permeate tubes 102 by wrapping each leaf around a permeate tube 102. Alternatively the leaves may be bonded to the permeate tubes 102 to facilitate the flow of the permeate into the permeate tubes 102. A suitable adhesive may be used for bonding the leaves to the permeate tubes 102. The permeate carrier 202 may include a seal 208 on the longitudinal sides and the transverse side at the end opposite to the permeate tube 102. The seal 208 may be formed using suitable sealing materials such as thermosetting polymers impregnated into the permeate carrier 202. The seal 208 prevents the entry of the feed solution directly into the permeate carrier 202 between the membranes 204. The seal 208 also prevents the leakage of the permeate from the sides of the permeate carrier 202. FIGS. 3 and 4 illustrate exemplary leaves coupled to permeate tubes 102a and 102b respectively, according to one embodiment. FIGS. 3 and 4 illustrate the seal 208 formed on the longitudinal sides and the transverse side opposite to the permeate tube 102.

Figure 5A:
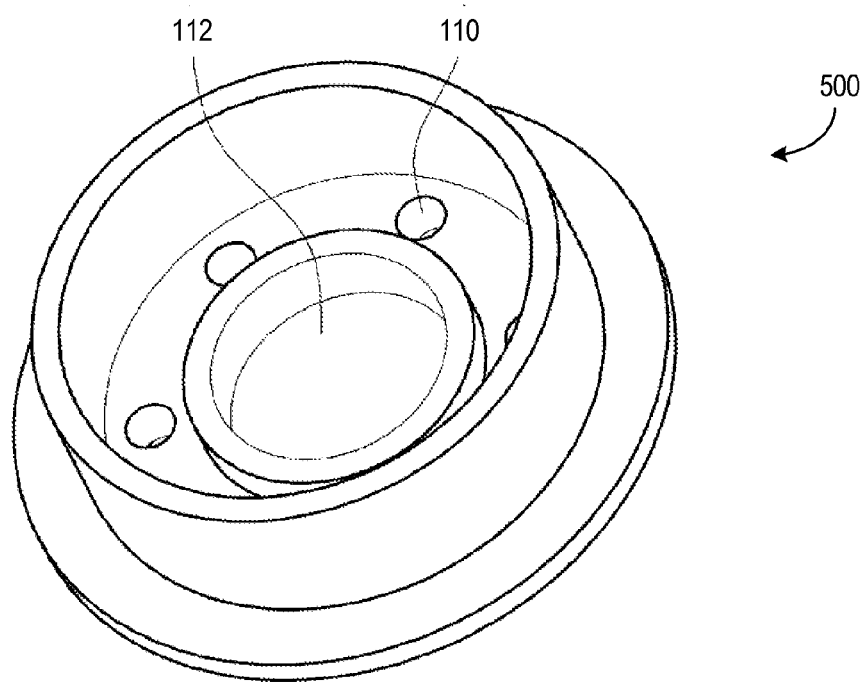
FIG. 5A illustrates an external view of an exemplary end cap, according to one embodiment.

FIG. 5A illustrates an external view 500 of an exemplary end cap 108, according to one embodiment. The external piping connections (not shown) or another element core 100 may be connected to the end caps 108, particularly to the permeate discharge ports 110 and the retentate discharge port 112, in order to extract the permeate and the retentate from the permeate tubes 102 and the retentate channel 106, respectively.

The connections may be screw type, including threads on the permeate discharge ports 110 and on the retentate discharge port 112. Alternatively, the external piping may be bonded to the permeate discharge ports 110 and the retentate discharge port 112 using an adhesive.

Figure 5B:
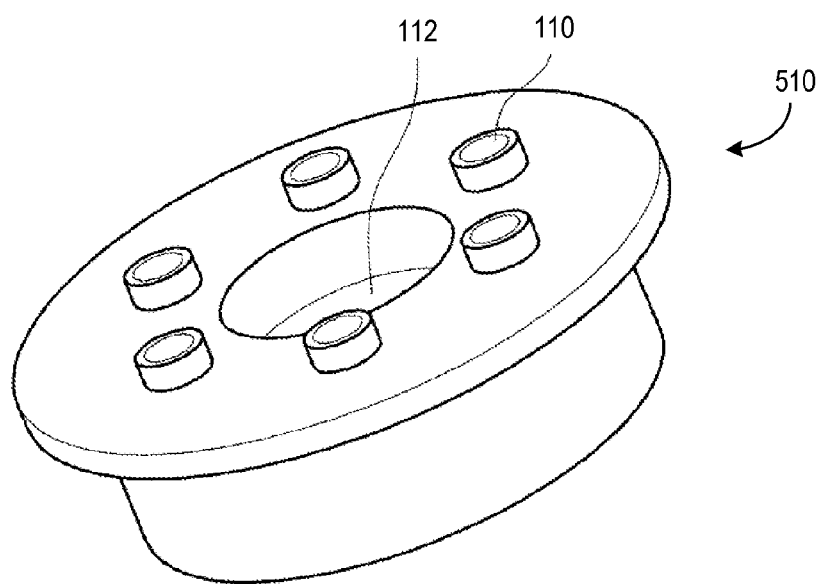
FIG. 5B illustrates an internal view of an exemplary end cap, according to one embodiment.

FIG. 5B illustrates an internal view 510 of an exemplary end cap 108, according to one embodiment. The end cap 108 may be manufactured from any material such as, but not limited to, plastic, composites, metal, alloys and the like. The end cap 108 may be manufactured using techniques such as, without limitation, injection molding.

The end caps 108 and the permeate tubes 102 may be coupled together using threads present on the permeate tubes 102 and the permeate discharge ports 110. In an alternate embodiment, the end caps 108 and the permeate tubes 102 can be bonded using an adhesive. In a further embodiment, the end caps 108 and the permeate tubes 102 may also be fused together, to form one single arrangement.

Figure 6:
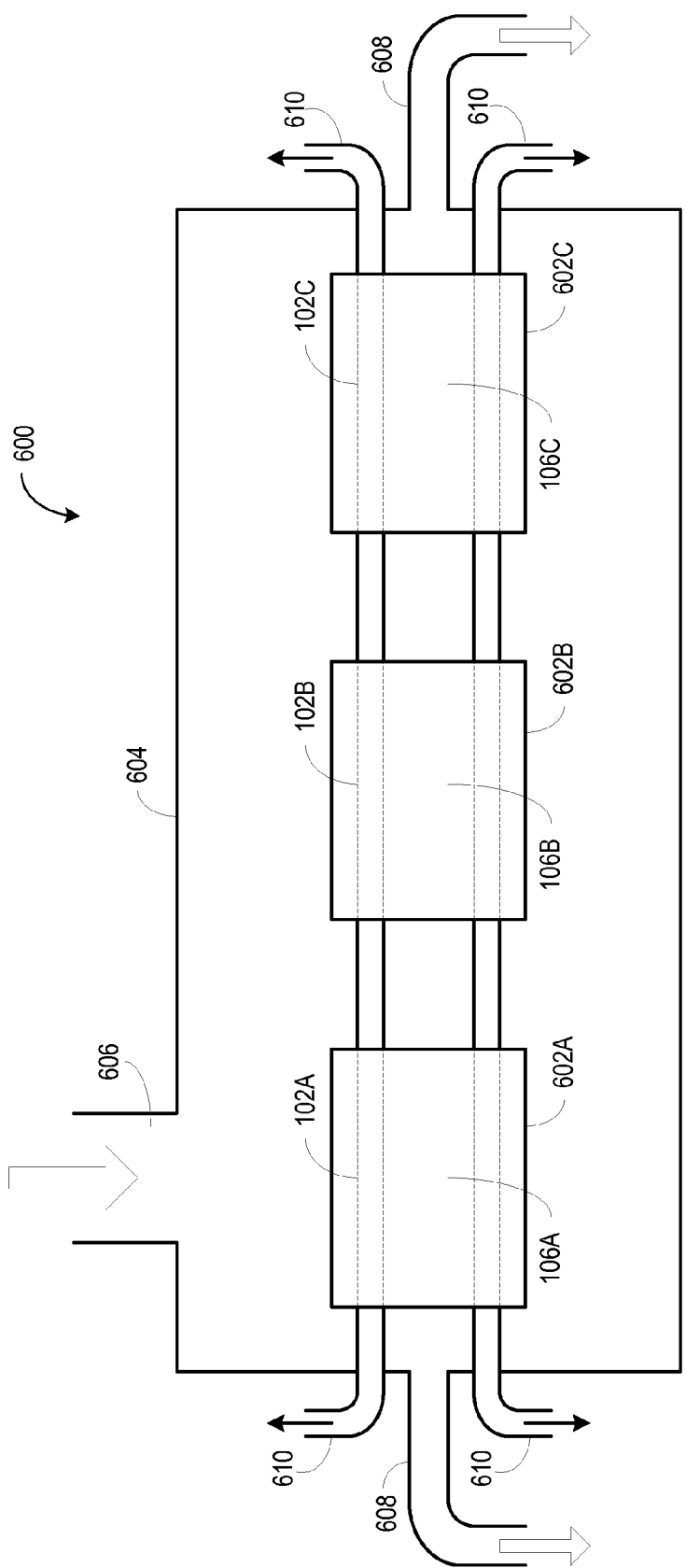
FIG. 6 illustrates an exemplary configuration of multiple reverse osmosis elements, according to one embodiment.

FIG. 6 illustrates an exemplary configuration 600 of multiple reverse osmosis elements 602, according to one embodiment. The configuration 600 shows the implementation with three reverse osmosis elements 602a, 602b and 602c. Further, a person of ordinary skill in the art will appreciate that the number of reverse osmosis elements 602 may be varied as per the requirements of the system.

The configuration 600 may include a pressure vessel 604. The pressure vessel 604 may include an inlet 606, facilitating the flow of pressurized feed water into the pressure vessel 604. The feed water may be pumped into the inlet 606 at high pressure, for instance 2-17 bar (30-250 PSI) for brackish water, and 40-70 bar (800-1000 PSI) for seawater. Further, the size of the pressure vessel 604 and the pressure of the feed water may be varied based on the factors such as, but not limited to, the number of reverse osmosis elements 602 implemented by the system, the type of leaf elements employed, the number of leaf elements per RO element, the level of recovery needed, and the like.

As shown in FIGS. 5A, and 5B, end caps 108 having both the permeate discharge ports 110, and the retentate discharge port 112 may be present for each of the three reverse osmosis elements 602a, 602b and 602c, along with external pipes connecting the three reverse osmosis elements 602a, 602b and 602c.

Further, at one end of each of the reverse osmosis elements 602a and 602c, a permeate outlet 610 may be connected on each end of the pressure vessel 604 to extract the permeate from either end. Similarly, at one end of each of the reverse osmosis elements 602a and 602c, a retentate outlet 608 may be connected on each end of the pressure vessel 604 to extract the retentate from either end. The connection between the permeate outlet 610 and the permeate discharge ports 110 may be done using any of the techniques used to attach the permeate pipe 102 and the end caps 108, as explained earlier. Similar types of connections may be employed for connecting the retentate discharge port 112 and the retentate output pipe 608.

Figure 7:
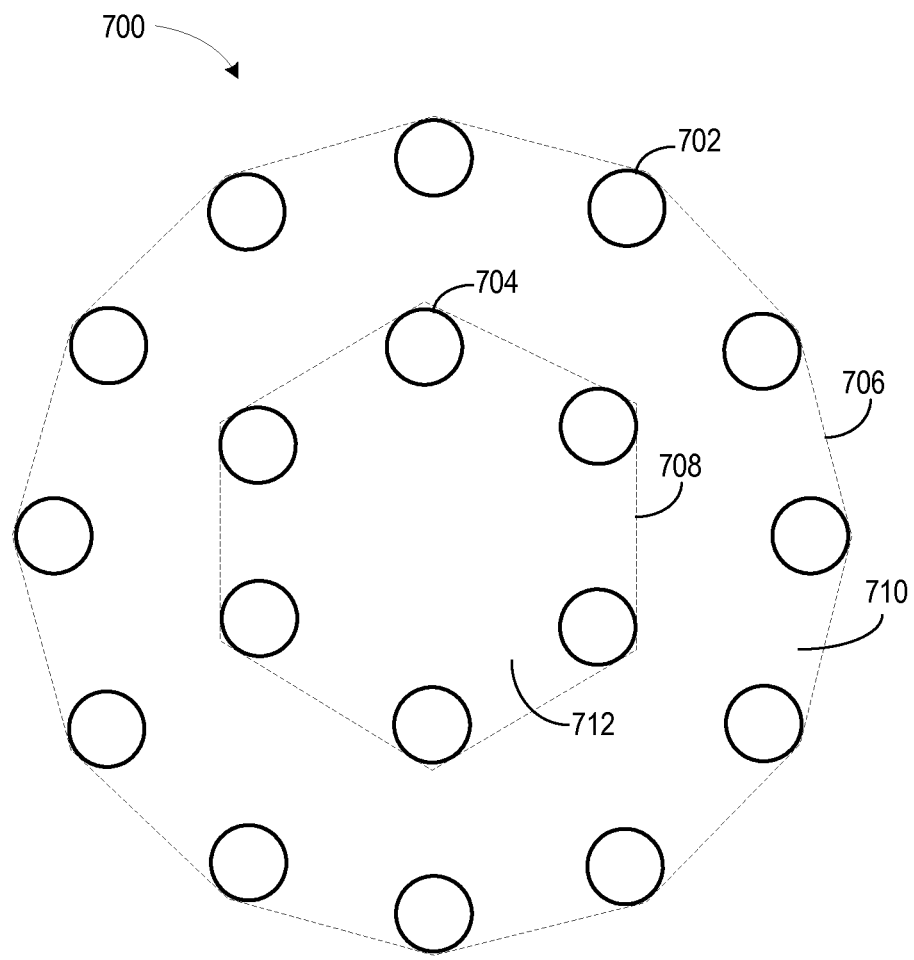
FIG. 7 illustrates an exemplary nested reverse osmosis element core, according to one embodiment.

FIG. 7 illustrates an exemplary nested RO element core 700, according to one embodiment. The nested RO element core 700 includes a two level nesting for performing the reverse osmosis process. The nested RO element core 700 may include a set of outer permeate tubes 702, and a set of inner permeate tubes 704. The outer permeate tubes 702 may be larger in diameter, and larger in number than the inner permeate tubes 704. The amount of permeate recovery obtained by the outer level of the nested RO element governs the size and number of the inner permeate tubes 704.

The outer permeate tubes 702 define an intermediate channel 710. The outer leaf elements (indicated by outline 706) seal the intermediate channel 710. The outer leaf elements provide a first stage of RO recovery of the feed solution. The permeate obtained from the first stage of RO recovery is collected in the outer permeate tubes 702, and discharged through associated permeate discharge ports. The intermediate retentate solution is then subject to a second stage of RO recovery through the inner leaf elements. The intermediate channel behaves as a pressure vessel for the inner leaf elements (indicated by outline 708). The permeate obtained from the second level of RO recovery is collected in the inner permeate tubes 704, and discharged through associated permeate discharge ports. The retentate is then collected in the retentate channel 712, and discharged through an associated retentate discharge port.

The size and number of the inner permeate tubes 704 are governed by the amount of permeate recovery obtained by the outer level of the nested RO element. For instance, if the outer level of the nested RO element provides a fifty percent permeate recovery, the inner level of the nested RO element may require half as many permeate tubes as the outer level to keep the feed flow velocity comparable to the feed flow velocity at the inlet of the outer level of the nested RO element.

Figure 8:
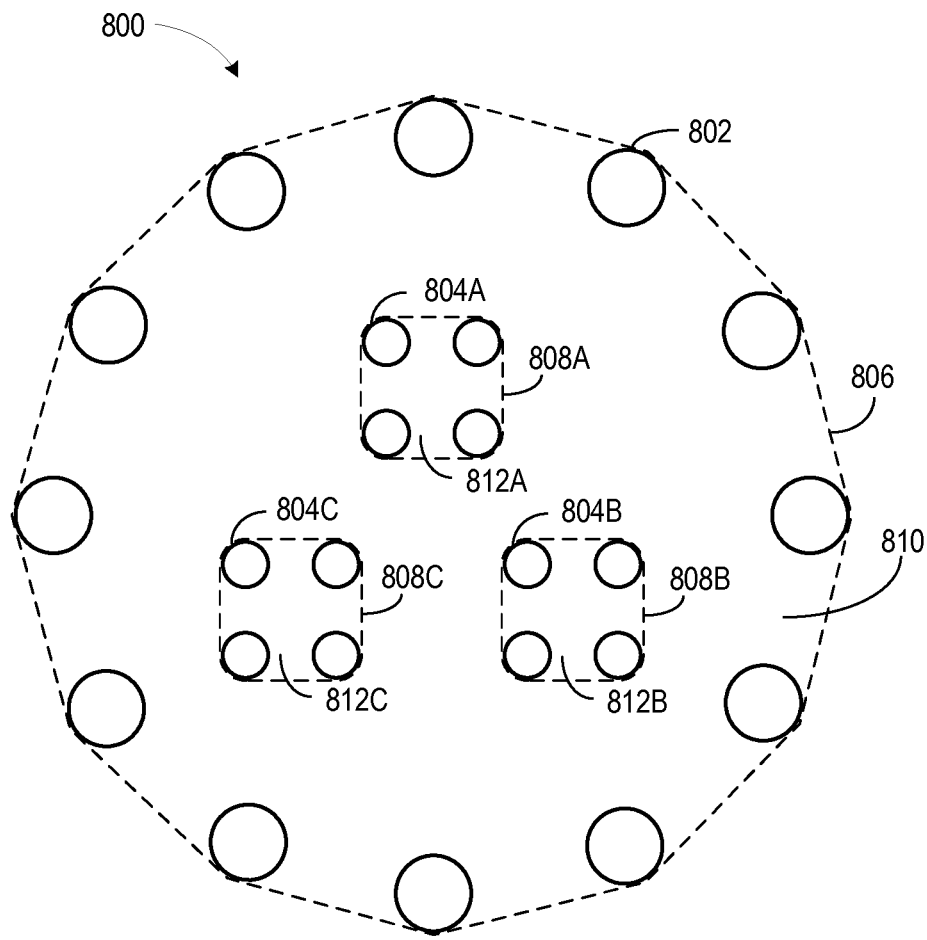
FIG. 8 illustrates an exemplary nested reverse osmosis element core, according to another embodiment.

FIG. 8 illustrates an exemplary nested RO element core 800, according to another embodiment. The nested RO element core 800 includes a two level nesting for performing the reverse osmosis process. The nested RO element core 800 may include a set of outer permeate tubes 802 forming an outer frame, and multiple sets of inner permeate tubes 804 forming multiple inner frames. The operation of such an RO element is similar to that described in conjunction with FIG. 7.

Figure 9:
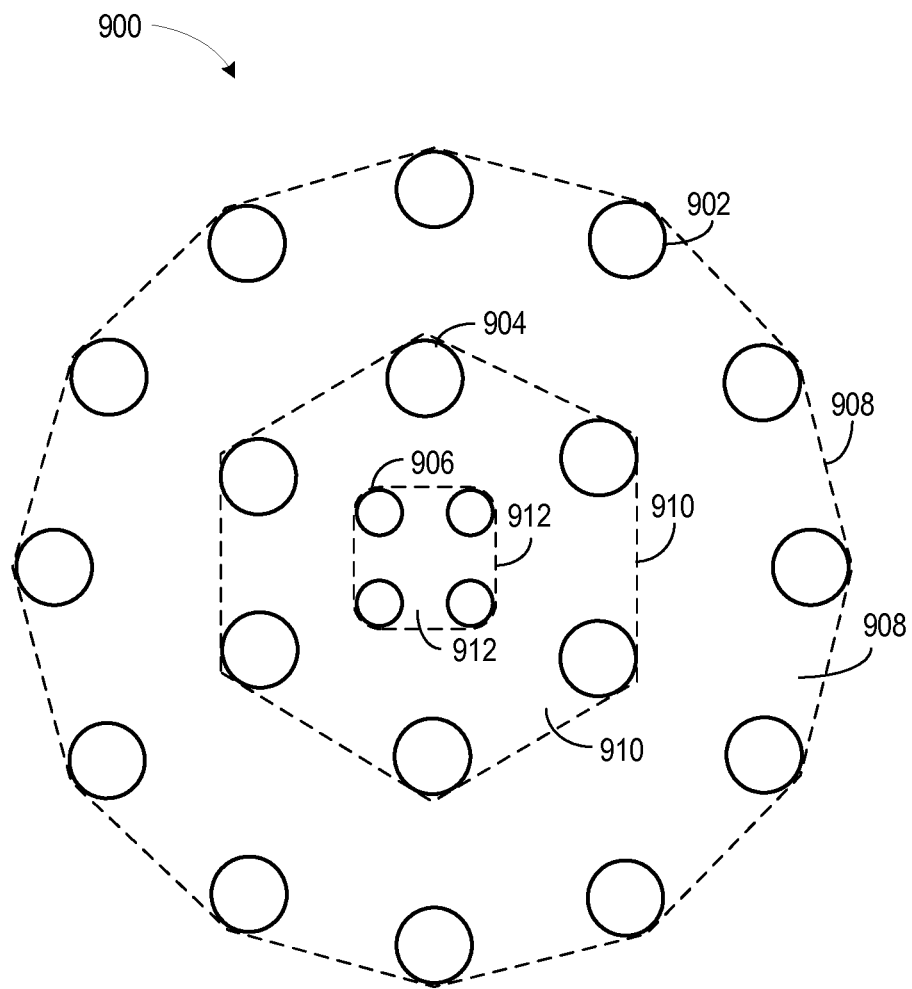
FIG. 9 illustrates an exemplary nested reverse osmosis element core, according to yet another embodiment.

FIG. 9 illustrates an exemplary nested RO element core 900 according to yet another embodiment. The nested RO element core 900 includes a three level nesting for performing the reverse osmosis process. The nested RO element core 900 includes a set of outer permeate tubes 902, a set of intermediate permeate tubes 904, and a set of inner permeate tubes 906. The feed solution undergoes three stages of RO recovery, with the permeate from each stage of RO recovery collected in the respective permeate tubes 902, 904, and 906. The operation of such an RO element is similar to that described in conjunction with FIG. 7.

The nested RO elements 700, 800, and 900 may discharge the permeates obtained from the different stages of RO recovery through separate discharge ports. Alternatively, the permeate collected in the permeate tubes of all the stages of the nested RO elements 700, 800, and 900 may be discharged through common permeate outlets.

The nested multi leaf RO elements described herein provide a compact RO element, with high efficiency and higher recovery than conventional single stage RO element designs. The reduced number of leaves in the inner stages aids in maintaining a high feed flow velocity in the inner feed channels, thus reducing the likelihood of fouling of the semipermeable membranes. The nested multi leaf RO elements may be stacked in a configuration similar to that described in conjunction with FIG. 6.

Although specific implementations and application areas are described in conjunction with the embodiments presented herein, such description is solely for the purpose of illustration. Persons skilled in the art will recognize from this description that such embodiments may be practiced with modifications and alterations limited only by the spirit and scope of the appended claims.

The invention claimed is:
1. A reverse osmosis element comprising:
a first plurality of leaves wound over and enclosing a plurality of outer permeate tubes of an outer frame and adapted to receive a feed solution and generate a first stage permeate solution and an intermediate retentate solution, each leaf of the first plurality of leaves being coupled to a respective permeate tube of the outer frame;
the plurality of outer permeate tubes being adapted to receive the first stage permeate solution;
an intermediate channel defined by the plurality of outer permeate tubes and the first plurality of leaves wound over the outer frame and adapted to receive the intermediate retentate solution from the first plurality of leaves of the outer frame;
a second plurality of leaves wound over and enclosing a plurality of inner permeate tubes of an inner frame and adapted to receive the intermediate retentate solution and generate a second stage permeate solution and a retentate feed, each leaf of the second plurality of leaves being coupled to a respective permeate tube of the inner frame;

the plurality of inner permeate tubes being adapted to receive the second stage permeate solution;

a retentate channel defined by the plurality of inner permeate tubes and the second plurality of leaves; and first and second end caps coupled to the plurality of outer and inner permeate tubes, wherein at least one of the first and second end caps comprises a retentate discharge port to discharge the retentate feed, and at least one of the first and second end caps comprises one or more permeate discharge ports to discharge the first stage permeate solution and the second stage permeate solution.

2. The reverse osmosis element of claim 1, wherein the plurality of permeate tubes have one of a circular cross section, a triangular cross section, a tear-drop shaped cross section, and an airfoil shaped cross section.

3. The reverse osmosis element of claim 1, wherein each leaf of the first and second plurality of leaves comprises a permeate carrier and a semi-permeable membrane.

4. The reverse osmosis element of claim 3, wherein alternate leaves of the first and second plurality of leaves additionally comprise a feed spacer.

5. The reverse osmosis element of claim 3, wherein each leaf of the first and second plurality of leaves additionally comprises a feed spacer.

6. The reverse osmosis element of claim 1, wherein each leaf of the first and second plurality of leaves is coupled to the permeate tube by wrapping the leaf around the permeate tube.

7. A water purification system comprising a reverse osmosis element according to claim 1.

8. A water purification system according to claim 7, comprising a plurality of reverse osmosis elements arranged in series.

9. A water purification system according to claim 7, wherein retentate discharge ports of adjacent reverse osmosis element are in fluid communication.

10. A water purification system according to claim 7, wherein permeate discharge ports of adjacent reverse osmosis element are in fluid communication.

11. A method for purification of feed fluid, the method comprising:

passing a feed fluid through an outer frame comprising a plurality of outer permeate tubes and a first plurality of leaves coupled to respective outer permeate tubes of the outer frame to generate a first stage permeate feed and an intermediate retentate solution;

collecting the first stage permeate feed in the outer permeate tubes of the outer frame and discharging the first stage permeate feed through a permeate discharge port;

passing the intermediate retentate solution from the plurality of outer permeate tubes through an intermediate channel defined by the outer permeate tubes and the first plurality of leaves to an inner frame defined by a plurality of inner permeate tubes and a second plurality of leaves wound over and enclosing the inner permeate tubes to obtain a second stage permeate feed and a retentate feed; and collecting the second stage permeate feed via the inner permeate tubes of the inner frame and discharging the second stage permeate feed through the permeate discharge port;

whereby the inner frame and the outer frame are arranged such that the feed flow velocity at the inlet of the inner frame is equal to the feed flow velocity at the inlet of the outer frame.

12. The method of claim 11, comprising collecting the retentate feed from a plurality of retentate discharge ports associated with a retentate channel defined by the inner frame.

* * * * *